(12) United States Patent
Ono et al.

(10) Patent No.: US 12,548,830 B2
(45) Date of Patent: Feb. 10, 2026

(54) ALL-SOLID-STATE BATTERY AND PHOTOCURABLE COMPOSITION USED IN ALL-SOLID-STATE BATTERY

(71) Applicants: TOYOTA JIDOSHA KABUSHIKI KAISHA, Toyota (JP); TOAGOSEI CO., LTD., Tokyo (JP)

(72) Inventors: Masato Ono, Nagoya (JP); Kazuhito Kato, Nagoya (JP); Keiichi Minami, Shizuoka-ken (JP); Katsuaki Odagi, Toyohashi (JP); Kazumasa Inata, Kasugai (JP); Yousuke Koide, Nagoya (JP)

(73) Assignees: TOYOTA JIDOSHA KABUSHIKI KAISHA, Toyota (JP); TOAGOSEICO., LTD

( * ) Notice: Subject to any disclaimer, the term of this patent is extended or adjusted under 35 U.S.C. 154(b) by 1258 days.

(21) Appl. No.: 17/366,155

(22) Filed: Jul. 2, 2021

(65) Prior Publication Data

US 2022/0077528 A1    Mar. 10, 2022

(30) Foreign Application Priority Data

Jul. 9, 2020  (JP) ................................. 2020-118340

(51) Int. Cl.
*H01M 50/193*    (2021.01)
*C08F 220/28*    (2006.01)
(Continued)

(52) U.S. Cl.
CPC ....... *H01M 50/193* (2021.01); *C08F 220/282* (2020.02); *C08F 222/20* (2013.01);
(Continued)

(58) Field of Classification Search
CPC ............. H01M 10/05; H01M 10/0525; H01M 10/0562; H01M 10/0565; H01M 10/0585;
(Continued)

(56) References Cited

U.S. PATENT DOCUMENTS

| | | | |
|---|---|---|---|
| 6,844,029 B2 * | 1/2005 | Okada | C08G 18/6254 427/407.1 |
| 2016/0056421 A1 * | 2/2016 | Kim | B32B 27/18 428/354 |

(Continued)

FOREIGN PATENT DOCUMENTS

| | | |
|---|---|---|
| JP | H0645005 A | 2/1994 |
| JP | 2008146974 A | 6/2008 |

(Continued)

OTHER PUBLICATIONS

ESPACENET translation of JP2008146974A (Year: 2008).*
ESPACENET translation of JP2019197652A (Year: 2019).*

*Primary Examiner* — Nicholas A Smith
(74) *Attorney, Agent, or Firm* — Dickinson Wright, PLLC

(57) ABSTRACT

A photocurable composition includes a compound having one (meth)acryloyl group in one molecule and not having a urethane bond and a photoradical polymerization initiator as essential components, and further includes a compound having one (meth)acryloyl group in one molecule and not having a urethane bond, a compound having a (meth) acryloyl group and a urethane bond, and a compound having another ethylenically unsaturated group as optional components, in which a viscosity of the photocurable composition at 25° C. is 1 Pa·s to 100 Pa·s. The photocurable composition is a material for forming a resin layer on at least a part of a side surface of a laminated electrode body in an all-solid-state battery.

5 Claims, 1 Drawing Sheet

(51) Int. Cl.
  *C08F 222/20* (2006.01)
  *C08F 283/02* (2006.01)
  *H01M 10/0585* (2010.01)
  *H01M 50/184* (2021.01)
  *H01M 50/186* (2021.01)

(52) U.S. Cl.
  CPC ....... *C08F 283/02* (2013.01); *H01M 10/0585* (2013.01); *H01M 50/184* (2021.01); *H01M 50/186* (2021.01)

(58) Field of Classification Search
  CPC ........... H01M 10/4235; H01M 10/052; H01M 50/184; H01M 50/186; H01M 50/193; H01M 50/586; H01M 2300/0068; C08F 2/48; C08F 220/282; C08F 222/20; C08F 283/01; C08F 283/02; C08F 283/065; C08F 290/061; C08F 290/067; C08F 299/0428; C08F 222/1025; C08F 222/1063; C09D 4/06
  See application file for complete search history.

(56) References Cited

U.S. PATENT DOCUMENTS

| | | |
|---|---|---|
| 2017/0373300 A1 | 12/2017 | Maeda et al. |
| 2019/0097208 A1 | 3/2019 | Kawase et al. |
| 2020/0189236 A1* | 6/2020 | Takahashi .................. C09J 4/00 |
| 2023/0002636 A1* | 1/2023 | Zambanini .......... H01M 10/653 |

FOREIGN PATENT DOCUMENTS

| | | |
|---|---|---|
| JP | 2012038425 A | 2/2012 |
| JP | 2019061952 A | 4/2019 |
| JP | 2019197652 A | 11/2019 |
| WO | 2016152565 A1 | 9/2016 |

* cited by examiner

ALL-SOLID-STATE BATTERY AND PHOTOCURABLE COMPOSITION USED IN ALL-SOLID-STATE BATTERY

CROSS-REFERENCE TO RELATED APPLICATION

This application claims priority to Japanese Patent Application No. 2020-118340 filed on Jul. 9, 2020, incorporated herein by reference in its entirety.

BACKGROUND

1. Technical Field

The disclosure relates to an all-solid-state battery and a photocurable composition used in the all-solid-state battery.

2. Description of Related Art

A secondary battery, such as a lithium ion secondary battery capable of realizing a relatively high output and a high capacity is useful as a vehicle-mounted electrical power supply in which electricity is used as a driving source or as an electrical power supply mounted on electric products, such as a personal computer or a portable device. In particular, a light-weight lithium ion secondary battery capable of obtaining a high energy density is preferable as a high-output electrical power supply for driving a vehicle, such as an electric vehicle (EV), a plug-in hybrid vehicle (PHV), or a hybrid vehicle (HV), and it is expected that the demand for this lithium ion secondary battery will increase in the future.

Examples of a configuration of the high-output secondary battery include a secondary battery having a configuration in which a powdered solid electrolyte is used instead of a liquid electrolyte (electrolyte solution), that is, a so-called an all-solid-state battery. In the all-solid-state battery, a liquid electrolyte is not used. Therefore, a laminated electrode body having a laminate structure in which positive and negative electrodes and a separator layer (also referred to as "solid electrolyte layer") are laminated can be easily constructed without performing a complicated process demanded to handle an organic solvent, such as a nonaqueous electrolyte solution. In addition, since an electrolyte solution is not used, the structure of an electrode body is simple, which also contributes to improvement of the battery capacity per unit volume of the battery. Therefore, the all-solid-state battery is expected as a high-output electrical power supply for driving a vehicle where higher capacity is demanded.

Examples of the solid electrolyte used in the all-solid-state battery include a sulfide-based solid electrolyte containing a sulfur compound and an oxide-based solid electrolyte containing an oxide. In particular, a so-called sulfide-based all-solid-state battery in which a sulfide-based solid electrolyte having a high lithium ion conductivity is used has attracted attention.

Meanwhile, when a high pressure is applied to the all-solid-state battery, cracking or deformation may occur in an end portion of the solid electrolyte or the electrode body. When the cracked electrode body moves in the battery and comes into contact with a counter electrode side, the battery may be short-circuited. In order to reduce the possibility of short-circuiting, for example, Japanese Unexamined Patent Application Publication No. 2019-61952 (JP 2019-61952 A), Japanese Unexamined Patent Application Publication No. 2012-38425 (JP 2012-38425 A), and WO 2016/152565 describe that a resin material is used for fixing and sealing a side surface of the laminated electrode body.

SUMMARY

However, when the all-solid-state battery is used, various characteristics are demanded for the resin material for fixing the side surface of the laminated electrode body. In JP 2019-61952 A, an acrylic resin is used for sealing an all-solid-state battery. However, for example, when an acrylic resin is used for sealing a sulfide-based all-solid-state battery, the resin and a sulfide-based solid electrolyte cause an oxidation reaction to occur, and deterioration of the battery performance may progress due to repeated charging and discharging. In addition, in addition to the low reactivity where the resin material does not react with a laminated electrode body, various characteristics are demanded for the resin material. For example, the following characteristics are demanded, and the development of a material suitable for forming a resin layer is desired, the characteristics including: potential resistance where the resin material endures a wide potential environment; flexibility where the resin material can follow expansion and contraction caused by rapid charging and discharging of the battery; and productivity where the resin material is likely to be applied without penetrating into a laminate.

The disclosure provides a resin material that has low reactivity with a sulfide-based solid electrolyte and is suitable for forming a resin layer. The disclosure also provides an all-solid-state battery in which the material disclosed herein is used for forming a resin layer on a side surface of a laminated electrode body.

A first aspect of the disclosure relates to a photocurable composition for an all-solid-state battery. The photocurable composition includes a first component (A) and a fifth component (E) as essential components and a second component (B), a third component (C), and a fourth component (D) as optional components.

The first component (A) is a compound having two (meth)acryloyl groups in one molecule and not having a urethane bond.

The second component (B) is a compound having one (meth)acryloyl group in one molecule and not having a urethane bond.

The third component (C) is a compound having one or more (meth)acryloyl groups and one or more urethane bonds in one molecule.

The fourth component (D) is a compound having an ethylenically unsaturated group other than the first component (A), the second component (B), and the third component (C).

The fifth component (E) is a photoradical polymerization initiator.

When a total content of the first component (A), the second component (B), the third component (C), and the fourth component (D) that are curable components is represented by 100 wt %, a total content ratio of the first component (A) and the second component (B) is 60 wt % to 100 wt %, a content ratio of the third component (C) is 0 wt % or higher and lower than 40 wt %, and a content ratio of the fourth component (D) is 0 wt % or higher and lower than 40 wt %. When the total content of the curable components is represented by 100 parts by weight, a content ratio of the fifth component (E) is 0.01 parts by weight to 10 parts by weight. A viscosity of the photocurable composition at 25° C. is 1 Pa·s to 100 Pa·s. The all-solid-state battery includes a laminated electrode body in which electrode bodies are laminated. Each of the electrode bodies includes a positive electrode, a negative electrode, and a solid electrolyte layer containing a sulfur material. The positive electrode and the negative electrode are laminated via the solid electrolyte layer. The photocurable composition is a material for forming a resin layer made of a resin cured product, on at least a part of a side surface of the laminated electrode body.

In the photocurable composition (resin material), the configurations of the curable components, that is, the content of the (meth)acryloyl group, the ratio of the urethane bond, and the like are regulated. With the first aspect, the reaction of the resin layer and a sulfide-based solid electrolyte can be suppressed, and the laminated electrode body of a sulfide-based all-solid-state battery can be sealed favorably.

In the photocurable composition according to the first aspect, the first component (A) may include a compound having a number average molecular weight of 1000 or higher. As a result, the flexibility and the like of the resin material can be further improved, the effects of the technique disclosed herein can be exhibited at a higher level.

In the photocurable composition according to the first aspect, the first component (A) may include a compound having a polyester skeleton. As a result, the flexibility and the like of the resin material can be further improved, the effects of the technique disclosed herein can be exhibited at a higher level.

A second aspect of the disclosure relates to an all-solid-state battery. The all-solid-state battery includes a laminated electrode body and a resin layer. In the laminated electrode body, electrode bodies each of which includes a positive electrode, a negative electrode, and a solid electrolyte layer containing a sulfur material are laminated. The positive electrode and the negative electrode are laminated via the solid electrolyte layer. The resin layer formed on at least a part of a side surface between an upper surface and a lower surface, the upper and lower surfaces being two wide surfaces at both ends of the laminated electrode body in a direction in which the electrode bodies are laminated. The resin layer is made of a cured product of the photocurable composition according to the first aspect. By forming the resin layer on the part of the side surface of the laminated electrode body, an all-solid-state battery having low reactivity of the sulfur material and the resin layer and higher reliability can be provided.

In the all-solid-state battery according to the second aspect, after performing a durability test where the battery is charged and discharged in 300 cycles at a temperature of 60° C., a charging condition of 2 C, and a discharging condition of 2 C, a battery capacity retention may be 90% or higher.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
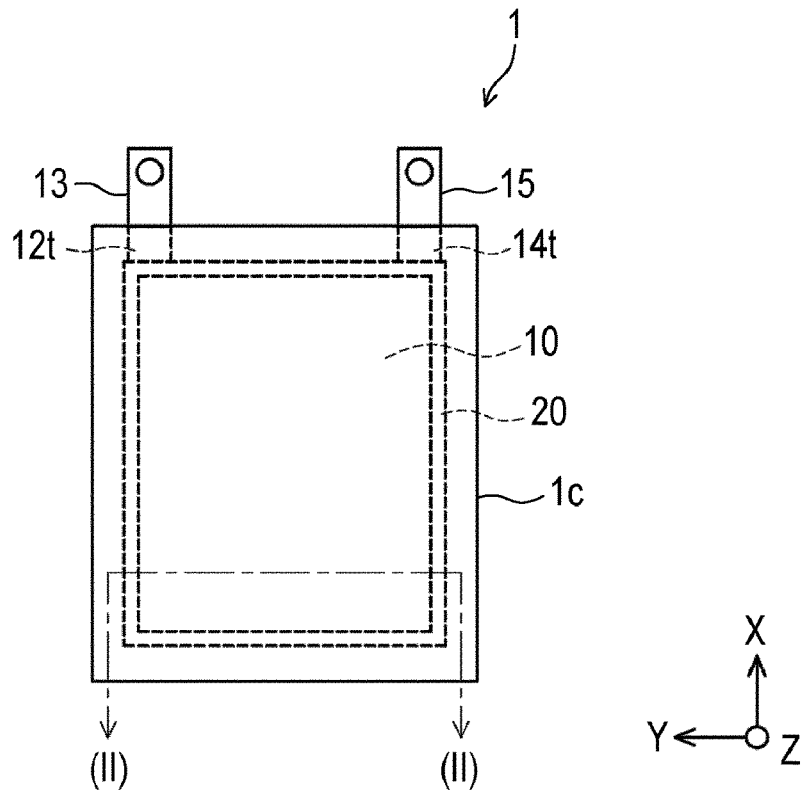
FIG. 1 is a plan view schematically showing an all-solid-state battery according to one embodiment.

Hereinafter, a preferable embodiment of a photocurable composition for forming a resin layer that is a material for forming a resin layer disclosed herein and an all-solid-state battery in which the photocurable composition is used will be described appropriately with reference to the drawings. Of course, the following embodiment is not intended to limit the technique disclosed herein. Matters demanded to implement the technique disclosed herein other than those specifically referred to in this specification may be understood as design matters based on the related art in the pertinent field for a person of ordinary skills in the art. The material for forming a resin layer disclosed herein can be prepared and used based on the contents disclosed in this specification and common technical knowledge in the pertinent field. In addition, in this specification, when a numerical range is described as A to B (here, A and B represent any numerical values), the numerical range represents A or more and B or less.

In the following drawings, parts or portions having the same function are represented by the same reference numerals, and the repeated description will not be made or will be simplified. In addition, a reference numeral Z in the drawings represents a laminating direction of a laminated electrode body. A reference numeral X in the drawings represents a direction perpendicular to the laminating direction Z and represents a long side direction of the all-solid-state battery and the laminated electrode body. A reference numeral Y in the drawings represents a direction perpendicular to the laminating direction Z and represents a short side direction of the all-solid-state battery and the laminated electrode body. Reference numerals Rand L in the drawings represent the right and the left in the short side direction. Note that these directions are set for convenience of description and do not limit an installation configuration of the all-solid-state battery.

Figure 2:
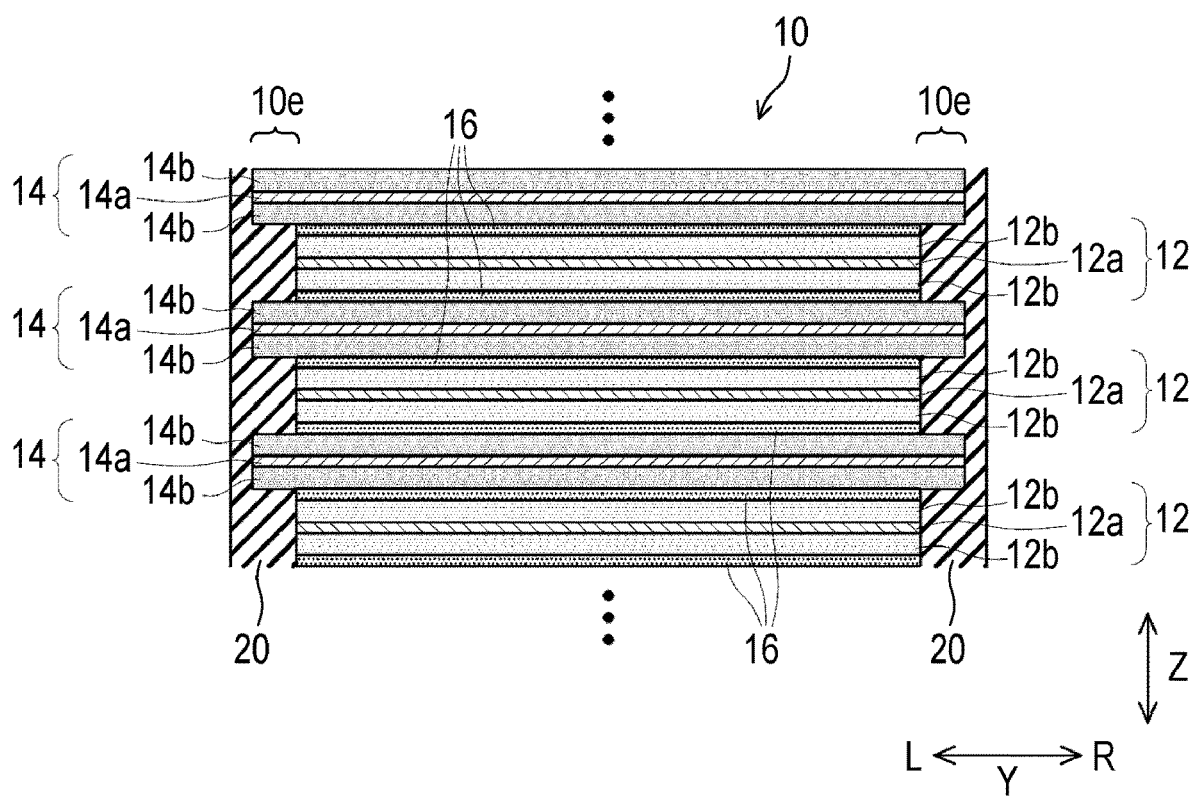
FIG. 2 is a sectional view taken along the line II-II in FIG. 1 showing a structure of a laminated electrode body of the all-solid-state battery.

FIG. 1 is a plan view schematically showing the all-solid-state battery according to the embodiment. FIG. 2 is a sectional view taken along line II-II of FIG. 1. Hereinafter, the respective components will be sequentially described. An all-solid-state battery 1 according to the embodiment includes: a hexahedral laminated electrode body 10 in which a plurality of rectangular positive electrodes and a plurality of rectangular negative electrodes are laminated via a plurality of solid electrolyte layers; and a resin layer 20 formed on each of at least two side surfaces (hereinafter, referred to as "laminated end portions 10e") on a long side when two rectangular wide surfaces at both ends of the laminated electrode body 10 in a direction in which the positive and negative electrodes are laminated are represented by an upper surface and a lower surface, the resin layer 20 being formed of a cured product of a photocurable resin. The all-solid-state battery 1 is formed to have a sealed structure by accommodating and sealing the corresponding wide surfaces of the laminated electrode body 10 and the resin layer 20 in a rectangular battery case 1c. A positive electrode terminal 13 shown in FIG. 1 is a connection terminal that is led out from the inside of the battery case 1c to the outside thereof, and is electrically connected to a short side of the positive electrode 12 through a positive electrode tab portion 12t. In addition, a negative electrode terminal 15 is a connection terminal that is led out from the inside of the battery case 1c to the outside thereof, and is electrically connected to a short side of the negative electrode 14 through a negative electrode tab portion 14t. As shown in the drawing, in the embodiment, the positive electrode terminal 13 and the negative electrode terminal 15 are provided on the same side of the all-solid-state battery in the long side direction X. The positive electrode terminal 13 and the negative electrode terminal 15 may be provided on different sides of the all-solid-state battery in the long side direction X.

The laminated electrode body 10 is configured to include electrode bodies in which the positive electrodes 12 and the negative electrodes 14 laminated via the solid electrolyte layers 16 in the laminating direction Z and are physically integrated. The positive electrode 12 includes: a positive electrode current collector 12a; and a positive electrode mixture layer 12b that is fixed to each of both surfaces of the positive electrode current collector 12a. The negative electrode 14 includes: a negative electrode current collector 14a; and a negative electrode mixture layer 14b that is fixed to each of both surfaces of the negative electrode current collector 14a. In the laminating direction Z, the solid electrolyte layer 16 is disposed between the positive electrode mixture layer 12b and the negative electrode mixture layer 14b and insulates the positive electrode 12 and the negative electrode 14 from each other.

The positive electrode 12 has a sheet shape and is rectangular in a plan view. At one end of the positive electrode 12 in the long side direction X, the positive electrode tab portion 12t that electrically connects the positive electrode current collector 12a and the positive electrode terminal 13 to each other is provided. In the embodiment, the positive electrode 12 includes: the positive electrode current collector 12a; and the positive electrode mixture layer 12b that is fixed to each of both surfaces of the positive electrode current collector 12a. The positive electrode current collector 12a is a conductive member and is not particularly limited. For example, a foil-shaped body formed of a highly conductive metal, such as Al, Ni, Ti, SUS, Cr, Pt, Fe, or Zn is used. For example, in order to reduce the interface resistance between the positive electrode current collector and the solid electrolyte layer 16, a coating layer, such as carbon may be provided on a surface of the positive electrode current collector.

Typically, the positive electrode mixture layer 12b includes a positive electrode active material and a solid electrolyte. The positive electrode active material is a material capable of reversibly storing and releasing charge carriers, and various compounds used for this kind of battery can be used. The positive electrode active material is not particularly limited. For example, a lithium transition metal composite oxide, such as a lithium cobalt-containing composite oxide, a lithium nickel-containing composite oxide, a lithium nickel cobalt-containing composite oxide, a lithium manganese-containing composite oxide, or a lithium nickel cobalt manganese-containing composite oxide is used. The thickness of the positive electrode mixture layer 12b is not particularly limited and may be, for example, 0.1 μm to 1000 μm.

As the solid electrolyte in the positive electrode mixture layer 12b, a solid electrolyte including a sulfur material used for a sulfide-based all-solid-state battery, that is, a so-called sulfide-based solid electrolyte can be used. The solid electrolyte is not particularly limited. For example, a sulfur material, such as a $Li_2S$—$P_2S_5$ material, a $Li_2S$—$SiS_2$ material, a $Li_2S$—$P_2S_3$ material, a $Li_2S$—$GeS_2$ material, a $Li_2S$—$B_2S_3$ material, or a $Li_3PO_4$—$P_2S_5$ material is used.

The positive electrode mixture layer 12b may include a component, such as a binder or a conductive material in addition to the positive electrode active material or the solid electrolyte. As the binder, for example, a fluorine binder, such as polyvinylidene fluoride (PVDF) or a rubber binder, such as butadiene rubber (BR) may be included. As the conductive material, for example, a carbon material, such as acetylene black, carbon black, graphite, carbon fiber, or carbon nanotube may be included.

By mixing the material with a nonaqueous solvent, such as butyl butyrate, heptane, or N-methylpyrrolidone, a paste-like positive electrode mixture can be prepared. The positive electrode mixture layer 12b can be formed on the positive electrode current collector 12a or the solid electrolyte layer 16 described below using a well-known method. Examples of the method include a method including transferring the positive electrode mixture at a pressure of about 100±50 MPa; pressing the positive electrode mixture at a pressure of about 600±100 MPa; and drying the positive electrode mixture. The positive electrode mixture can be pressed using a well-known method, and examples of the method include mechanical pressing through a ball screw, a hydraulic pressure, or the like and gas pressing through gas.

The negative electrode 14 has a sheet shape and is rectangular in a plan view. At one end of the negative electrode 14 in the long side direction X, the negative electrode tab portion 14t that electrically connects the negative electrode current collector 14a and the negative electrode terminal 15 to each other is provided. In the embodiment, the negative electrode 14 includes: the negative electrode current collector 14a; and the negative electrode mixture layer 14b that is fixed to each of both surfaces of the negative electrode current collector 14a. The negative electrode current collector 14a is a conductive member and is not particularly limited. For example, a foil-shaped body formed of a highly conductive metal, such as Cu, Ti, Ni, SUS, Fe, Co, or Zn is used. The thickness of the negative electrode mixture layer 14b is not particularly limited and may be, for example, 0.1 μm to 1000 μm.

Typically, the negative electrode mixture layer 14b includes a negative electrode active material and a solid electrolyte. The negative electrode active material is a material capable of reversibly storing and releasing charge carriers, and various compounds used for this kind of battery can be used. The negative electrode active material is not particularly limited. For example, a carbon material, such as graphite or carbon black is used. As the solid electrolyte in the negative electrode mixture layer 14b, for example, the sulfur material described as the example of the sulfide-based solid electrolyte used for the positive electrode mixture layer 12b can be used.

In addition, the negative electrode mixture layer 14b may include a component, such as a binder or a conductive material in addition to the negative electrode active material or the solid electrolyte. The binder or the conductive material can be appropriately selected and used, for example, among the examples described as the material that can be used for the positive electrode mixture layer 12b.

By mixing the material with a nonaqueous solvent, such as butyl butyrate, heptane, or N-methylpyrrolidone, a paste-like negative electrode mixture can be prepared. The negative electrode mixture layer 14b can be formed on the negative electrode current collector 14a using a well-known method. Examples of the method include a method including transferring the negative electrode mixture at a pressure of about 100±50 MPa; pressing the negative electrode mixture at a pressure of about 600±100 MPa; and drying the negative electrode mixture. The negative electrode mixture can be pressed using a well-known method, and examples of the method include mechanical pressing through a ball screw; a hydraulic pressure, or the like and gas pressing through gas.

The solid electrolyte layer 16 includes a solid electrolyte material having ion conductivity as a major component. As the solid electrolyte used for the solid electrolyte layer 16, for example, the sulfur material described as the example of the sulfide-based solid electrolyte used for the positive electrode mixture layer 12b can be used. The solid electrolyte layer 16 may include a component, such as a binder as a component other than the solid electrolyte. The binder can be appropriately selected and used, for example, among the examples described as the material that can be used for the positive electrode mixture layer 12b. The thickness of the solid electrolyte layer 16 is not particularly limited and is, for example, 0.1 to 1000 μm and preferably 0.1 to 300 μm.

By mixing the material with a nonaqueous solvent, such as butyl butyrate, heptane, or N-methylpyrrolidone, a paste-like solid electrolyte layer mixture can be prepared. The solid electrolyte layer 16 can be formed on the mixture layers of positive and negative electrodes using a well-known method. Examples of the method include a method including transferring the solid electrolyte layer mixture at a pressure of about 100±50 MPa; pressing the solid electrolyte layer mixture at a pressure of about 600±100 MPa; and drying the solid electrolyte layer mixture. The solid electrolyte layer mixture can be pressed using a well-known method, and examples of the method include mechanical pressing through a ball screw, a hydraulic pressure, or the like and gas pressing through gas.

The laminated electrode body 10 has a configuration in which the positive electrodes 12 and the negative electrodes 14 are laminated via the solid electrolyte layers 16. The laminated electrode body 10 can be prepared using a well-known method, such as pressing or bonding. In one embodiment, as shown in FIG. 2, the negative electrode mixture layer 14b, the solid electrolyte layer 16, and the positive electrode mixture layer 12b are formed in this order on each of both surfaces of the negative electrode current collector 14a, and the positive electrode current collector 12a is formed on a single surface thereof. As a result, a unit electrode body can be prepared. The positive electrode current collector 12a can be formed by bonding a thermoplastic resin, such as ethylene-vinyl acetate copolymer (EVA), polyolefin, or low-density polyethylene (LDPE) at 140° C. at a pressure of 1 MPa. By laminating the unit electrode bodies, the laminated electrode body 10 can be prepared.

As shown in FIGS. 1 and 2, the resin layer 20 seals at least a part of side surfaces of the positive electrode mixture layer 12b and the negative electrode mixture layer 14b and has integrity with the laminated electrode body 10. The length of the resin layer 20 in the laminating direction Z is longer than or equal to the length of the laminated electrode body 10 in the laminating direction Z. In a sectional view; the laminated end portions 10e (for example, peripheral edge portions of the positive electrode mixture layer 12b and the negative electrode mixture layer 14b) of the laminated electrode body 10 are not exposed. As a result, the resin layer 20 can suppress the collapsing of the peripheral edge portions of the positive electrode mixture layer 12b and the negative electrode mixture layer 14b and the sliding down of the active materials.

The resin layer 20 is a cured product of a photocurable composition and includes, among a first component (component (A)), a second component (component (B)), a third component (component (C)), a fourth component (component (D)), and a fifth component (component (E)), the component (A) and the component (E) as essential components and further includes the component (B), the component (C), and the component (D) as optional components.

Component (A): a compound having two (meth)acryloyl groups in one molecule and not having a urethane bond Component (B): a compound having one (meth)acryloyl group in one molecule and not having a urethane bond Component (C): a compound having one or more (meth)acryloyl groups and one or more urethane bonds in one molecule Component (D): a compound having an ethylenically unsaturated group other than the components (A), (B), and (C)

Component (E): a photoradical polymerization initiator

In this specification, (meth)acrylate represents acrylate or methacrylate, and the (meth)acryloyl group represents an acryloyl group or a methacryloyl group.

In the photocurable composition that is the material for forming the resin layer 20, regarding the content ratio between the components (A), (B), (C), (D), and (E), when a total content of the components (A), (B), (C), and (D) that are curable components is represented by 100 wt %, a total content ratio of the component (A) and the component (B) is 60 wt % to 100 wt %, a content ratio of the component (C) is 0 wt % or higher and lower than 40 wt %, and a content ratio of the component (D) is 0 wt % or higher and lower than 40 wt %. When the total content of the curable components is represented by 100 parts by weight, a content ratio of the component (E) is 0.01 parts by weight to 10 parts by weight.

In the embodiment, the component (A) as a curable component is a compound having two (meth)acryloyl groups in one molecule and not having a urethane bond. As the component (A), for example, an acrylic monomer, oligomer, or polymer described below can be used. By including the component (A), a reaction of the sulfur material in the solid electrolyte layer 16 and the resin layer 20 can be suppressed.

In the embodiment, the component (A) is included as an essential component. When the total content of the components (A), (B), (C), and (D) as the curable components is represented by 100 wt %, the content ratio of the component (A) is appropriately 10 wt % or higher, preferably 80 wt % or higher, and more preferably substantially 100 wt %. In addition, the total content ratio of the component (A) and the component (B) described below is appropriately 60 wt % or higher, preferably 70 wt %, and more preferably substantially 100 wt %.

When the viscosity of the photocurable composition is excessively high, the operability is not excellent. When the viscosity of the photocurable composition is excessively low, the photocurable composition penetrates into a gap between the layers of the laminated electrode body, which may cause deterioration in battery performance. The viscosity of the photocurable composition at 25° C. is preferably 1 Pa·s to 100 Pa·s and more preferably 1 Pa·s to 50 Pa·s.

In addition, from the viewpoints of the flexibility of the resin layer 20, penetration of the uncured material into the laminated electrode body, and the like, a number average molecular weight of the component (A) is appropriately 500 or higher, preferably 1000 or higher, and more preferably 3000 or higher. Further, by the component (A) having a polyester skeleton, the performance can be improved more favorably.

As the component (A), for example:
a di(meth)acrylate having an aliphatic skeleton, such as ethylene glycol di(meth)acrylate, propylene glycol di(meth)acrylate, neopentyl glycol di(meth)acrylate, 1,6-hexanediol di(meth)acrylate, 3-methyl-1,5-pentanediol di(meth)acrylate, 1,9-nonanediol di(meth) acrylate, or 2-butyl-2-ethyl-1,3-propanediol di(meth) acrylate;

a di(meth)acrylate having an alicyclic skeleton, such as cyclohexanedimethylol di(meth)acrylate, tricyclodecane dimethylol di(meth)acrylate, or di(meth)acrylate of hydrogenated bisphenol A;

a low-molecular-weight alkylene glycol di(meth)acrylate, such as diethylene glycol di(meth)acrylate, triethylene glycol di(meth)acrylate, dipropylene glycol di(meth) acrylate, tripropylene glycol di(meth)acrylate, or tetramethylene glycol di(meth)acrylate; and a di(meth)acrylate of a bisphenol compound alkylene oxide adduct, such as di(meth)acrylate of bisphenol A alkylene oxide adduct, di(meth)acrylate of bisphenol F alkylene oxide adduct, or di(meth)acrylate of bisphenol S alkylene oxide adduct can be used.

Examples of the component (A) other than the examples described above include an oligomer having two (meth) acryloyl groups in one molecule, such as polyester (meth) acrylate, epoxy (meth)acrylate, or polyether (meth)acrylate.

The polyester (meth)acrylate is a di(meth)acrylate having a polyester skeleton. Specific examples of the polyester (meth)acrylate include a dehydration esterification reaction product of polyester diol and (meth)acrylic acid, a dehydration esterification reaction product of diol, dibasic acid, and (meth)acrylic acid, and an ester exchange reaction product of polyester diol and a compound having one (meth)acrylic group. The polyester diol can be obtained through a reaction of diol and dibasic acid. Examples of the diol include neopentyl glycol, ethylene glycol, propylene glycol, 1,6-hexanediol, isononanediol, tricyclodecane dimethylol, and bis(hydroxymethyl)cyclohexane. Examples of the dibasic acid include succinic acid, phthalic acid, hexahydrophthalic anhydride, terephthalic acid, adipic acid, azelaic acid, and tetrahydrophthalic anhydride. Examples of the diol and the dibasic acid in the dehydration esterification reaction product of diol, dibasic acid, and (meth)acrylic acid include the same compounds as described above. Examples of the compound having one (meth)acrylic group include an alkyl (meth)acrylate having an alkyl group, such as methyl (meth) acrylate, ethyl (meth)acrylate, or butyl (meth)acrylate and an alkoxyalkyl (meth)acrylate, such as 2-methoxyethyl (meth) acrylate.

The epoxy (meth)acrylate is a compound obtained by an addition reaction of (meth)acrylic acid with an epoxy resin. Examples of the epoxy resin include an aromatic epoxy resin and an aliphatic epoxy resin.

Specific examples of the aromatic epoxy resin include: resorcinol diglycidyl ether or hydroquinone diglycidyl ether; bisphenol A, bisphenol F, bisphenol S, bisphenol fluorene, or diglycidyl ether of an alkylene oxide adduct thereof; and o-phthalic acid diglycidyl ester.

Specific examples of the aliphatic epoxy resin include: a diglycidyl ether of alkylene glycol, such as ethylene glycol, propylene glycol, 1,4-butanediol, or 1,6-hexanediol; a diglycidyl ether of polyalkylene glycol, such as a diglycidyl ether of polyethylene glycol or polypropylene glycol; a diglycidyl ether of neopentyl glycol, dibromo neopentyl glycol, or an alkylene oxide adduct thereof; a diglycidyl ether of hydrogenated bisphenol A or an alkylene oxide adduct thereof; and tetrahydrophthalic acid diglycidyl ester. As the alkylene oxide in the alkylene oxide adduct, for example, ethylene oxide or propylene oxide is preferable.

As the polyether (meth)acrylate oligomer, polyalkylene glycol (meth)diacrylate can be used, and examples thereof include polyethylene glycol di(meth)acrylate, polypropylene glycol di(meth)acrylate, and polytetramethylene glycol di(meth)acrylate.

As the di(meth)acrylate having a polyester skeleton that is a preferable compound of the component (A), polyester (meth)acrylate can be used, and specific examples thereof are as described above.

In the embodiment, the component (B) as a curable component is a compound having one (meth)acryloyl group in one molecule and not having a urethane bond. As the component (B), for example, an acrylic monomer, oligomer, or polymer can be used. As in the component (A), by the photocurable composition including the component (B), a reaction of the sulfur material in the solid electrolyte layer 16 and the resin layer 20 can be suppressed. In the embodiment, the component (B) is an optional component and may be included or may not be included as long as the total content ratio of the component (A) and the component (B) is 60 wt % to 100 wt %.

Examples of the component (B) include the following compounds having one (meth)acryloyl group in one molecule (hereinafter also referred to as "monofunctional (meth) acrylate").

Specific examples of the monofunctional (meth)acrylate include:

an alkyl (meth)acrylate, such as methyl (meth)acrylate, ethyl (meth)acrylate, propyl (meth)acrylate, isopropyl (meth)acrylate, butyl (meth)acrylate, isobutyl (meth) acrylate, 2-ethylhexyl (meth)acrylate, octyl (meth) acrylate, isooctyl (meth)acrylate, lauryl (meth)acrylate, or stearyl (meth)acrylate;

a (meth)acrylate of an alkylene oxide adduct of an aliphatic monool, such as ethoxyethoxyethyl (meth)acrylate or (meth)acrylate of ethylene oxide adduct of 2-ethylhexanol;

a hydroxyalkyl (meth)acrylate, such as 2-hydroxyethyl (meth)acrylate, 2-hydroxypropyl (meth)acrylate, or 4-hydroxybutyl (meth)acrylate;

a monofunctional (meth)acrylate having an alicyclic group, such as cyclohexyl (meth)acrylate, isobornyl (meth)acrylate, 1,4-cyclohexanedimethylol mono (meth)acrylate, dicyclopentanyl (meth)acrylate, dicyclopentenyl (meth)acrylate, or dicyclopentenyloxyethyl (meth)acrylate;

a monofunctional (meth)acrylate having an aromatic group, such as benzyl (meth)acrylate, (meth)acrylate of phenol alkylene oxide adduct, (meth)acrylate of p-cumyl phenol alkylene oxide adduct, (meth)acrylate of o-phenyl phenol alkylene oxide adduct, or (meth) acrylate of nonylphenol alkylene oxide adduct;

a mono(meth)acrylate of diol, such as pentanediol mono (meth)acrylate, hexanediol mono(meth)acrylate, diethylene glycol mono(meth)acrylate, triethylene glycol mono(meth)acrylate, tetraethylene glycol mono(meth) acrylate, polyethylene glycol mono(meth)acrylate, dipropylene glycol mono(meth)acrylate, tripropylene glycol mono(meth)acrylate, or polypropylene glycol mono(meth)acrylate;

a monofunctional (meth)acrylate having a hydroxyl group and an aromatic group, such as 2-hydroxy-3-phenoxypropyl (meth)acrylate;

a monofunctional (meth)acrylate having a cyclic ether group, such as glycidyl (meth)acrylate, tetrahydrofurfuryl (meth)acrylate, caprolactone-modified tetrahydrofurfuryl (meth)acrylate, (2-ethyl-2-methyl-1,3-dioxolane-4-yl)methyl (meth)acrylate, (2-isobutyl-2-methyl-1,3-dioxolane-4-yl)methyl (meth)acrylate, (1,4-dioxaspiro[4,5]decane-2-yl)methyl (meth)acrylate, 3,4-epoxy cyclohexyl methyl (meth)acrylate, or (3-ethyloxetane-3-yl)methyl (meth)acrylate;

a monofunctional (meth)acrylate having a maleimide group, such as N-(meth)acryloyloxyethyl hexahydrophthalimide or N-(meth)acryloyloxyethyl tetrahydrophthalimide;

a monofunctional (meth)acrylate having an isocyanate group, such as 2-(meth)acryloyloxymethyl isocyanate;

a monofunctional (meth)acrylate having an allyl group, such as allyl (meth)acrylate;

a monofunctional (meth)acrylate having a carboxyl group, such as 2-(meth)acryloyloxyethyl hexahydro phthalic acid, 2-(meth)acryloyloxyethyl succinic acid, or ω-carboxy-polycaprolactone mono(meth)acrylate;

a monofunctional (meth)acrylate having a phosphate group, such as 2-(meth)acryloyloxyethyl acid phosphate; and a monofunctional (meth)acrylate having an alkoxysilyl group, such as 3-(meth)acryloyloxypropyl trimethoxysilane, 3-(meth)acryloyloxypropyl dimethoxymethylsilane, or 3-(meth)acryloyloxypropyl triethoxysilane.

As a preferable compound of the component (B), for example, a (meth)acrylate of an alkylene oxide adduct of an aliphatic monool, a monofunctional (meth)acrylate having an aromatic group, or a monofunctional (meth)acrylate having a hydroxyl group and an aromatic group can be used, and specific examples thereof are as described above.

In the embodiment, the component (C) as a curable component is a compound having one or more (meth)acryloyl groups and one or more urethane bonds in one molecule. As the component (C), for example, urethane (meth)acrylate can be used. The component (C) can be prepared from a polyol, an organic polyisocyanate, and a hydroxyl group-containing (meth)acrylate described below. In the embodiment, the component (C) is an optional component, and the content ratio thereof is appropriately 0 wt % or higher and lower than 40 wt %, preferably 30 wt % or lower, and more preferably substantially 0 wt %.

As the polyol for preparing the component (C), diol is preferable. Examples of the diol include a low-molecular-weight diol, a diol having a polyene and/or polyolefin skeleton, a diol having a polyester skeleton, a diol having a polyether skeleton, and a diol having a polycarbonate skeleton. Examples of the low-molecular-weight diol include ethylene glycol, propylene glycol, cyclohexanedimethanol, neopentyl glycol, 3-methyl-1,5-pentanediol, and 1,6-hexanediol. Examples of the diol having a polyene and/or polyolefin skeleton include a diol having a polybutadiene skeleton, a diol having a polyisoprene skeleton, a diol having a hydrogenated polybutadiene skeleton, and a diol having a hydrogenated polyisoprene skeleton. Examples of the diol having a polyester skeleton include an esterification reaction product of a diol component, such as the low-molecular-weight diol or polycaprolactone diol and an acid component, such as dicarboxylic acid or an anhydride thereof. Examples of the dicarboxylic acid or the anhydride thereof include adipic acid, succinic acid, phthalic acid, tetrahydrophthalic acid, hexahydrophthalic acid, terephthalic acid, and anhydrides thereof. Examples of the polyether diol include polyethylene glycol, polypropylene glycol, and polytetramethylene glycol. Examples of the polycarbonate diol include a reaction product of the low-molecular-weight diol or/and a bisphenol such as bisphenol A and a dialkyl carbonate, such as ethylene carbonate or dibutyl carbonate.

As the organic polyisocyanate for preparing the component (C), an organic diisocyanate is preferable. Specific examples of the organic diisocyanate include an aliphatic diisocyanate, such as hexamethylene diisocyanate or 2,4,4-trimethylhexamethylene diisocyanate, an alicyclic diisocyanate, such as isophorone diisocyanate, 4,4'-methylenebis (cyclohexyl isocyanate), ω,ω'-diisocyanate dimethylcyclohexane, or dimer acid diisocyanate, and an aromatic diisocyanate, such as tolylene diisocyanate, xylylene diisocyanate, and diphenylmethane-4,4-diisocyanate.

Examples of the hydroxyl group-containing (meth)acrylate for preparing the component (C) include a hydroxyalkyl (meth)acrylate, such as 2-hydroxyethyl (meth)acrylate, 2-hydroxypropyl (meth)acrylate, 4-hydroxybutyl (meth)acrylate, hydroxypentyl (meth)acrylate, hydroxyhexyl (meth)acrylate, or hydroxyoctyl (meth)acrylate, and a compound having a hydroxyl group and one (meth)acryloyl group or two or more (meth)acryloyl groups, such as mono or di(meth)acrylate of trimethylolpropane, mono, di, or tri(meth)acrylate of pentaerythritol, mono, di, or, tri(meth) acrylate of ditrimethylolpropane, or mono, di, tri, tetra, or penta(meth)acrylate of dipentaerythritol. As the hydroxyl group-containing (meth)acrylate, hydroxyalkyl (meth)acrylate is preferable.

In the embodiment, the component (D) as a curable component is a compound having an ethylenically unsaturated group other than the components (A), (B), and (C). As the component (D), various compounds can be used as long as they are compounds having an ethylenically unsaturated group other than the components (A), (B), and (C), and a (meth)acrylate is preferable. In the embodiment, the component (D) is an optional component, and the content ratio thereof is appropriately 0 wt % or higher and lower than 40 wt %, preferably 30 wt % or lower, and more preferably substantially 0 wt %.

Specific preferable examples of the component (D) include a compound having three or more (meth)acryloyl groups in one molecule. Specific examples of the compound include: a polyol poly(meth)acrylate, such as pentaerythritol tri(meth)acrylate, pentaerythritol tetra(meth)acrylate, trimethylolpropane tri(meth)acrylate, glycerin tri(meth)acrylate, diglycerin tetra(meth)acrylate, dipentaerythritol penta(meth) acrylate, or dipentaerythritol hexa(meth)acrylate; tri(meth) acrylate of trimethylolpropane alkylene oxide adduct, tri (meth)acrylate of pentaerythritol alkylene oxide adduct, or tetra(meth)acrylate of pentaerythritol alkylene oxide adduct; and a (meth)acrylate having an isocyanurate skeleton, such as tri(meth)acrylate of isocyanuric acid alkylene oxide adduct or E-caprolactone-modified tris((meth)acryloxyethyl) isocyanurate. Examples of the alkylene oxide in the alkylene oxide adduct include ethylene oxide and propylene oxide.

In order to cure the curable components (A), (B), (C), and (D) in the embodiment, the curable components include the component (E) that is a photoradical polymerization initiator as an essential component. When the total weight of the curable components is represented by 100 parts by weight, the content ratio of the component (E) is appropriately 0.01 parts by weight to 10 parts by weight.

Specific examples of the component (E) include: an acetophenone compound, such as benzyl dimethyl ketal, 1-hydroxycyclohexyl phenyl ketone, 2-hydroxy-2-methyl-1-phenylpropane-1-one, 1-[4-(2-hydroxyethoxy)phenyl]-2-hydroxy-2-methyl-1-propane-1-one, oligo[2-hydroxy-2-methyl-1-[4-1-(methylvinyl)phenyl]propanone, 2-hydroxy-1-{4-[4-(2-hydroxy-2-methyl-propionyl)benzyl]phenyl}-2- methylpropan-1-one, 2-methyl-1-[4-(methylthio)]phenyl]-2-morpholinopropane-1-one, 2-benzyl-2-dimethylamino-1-(4-morpholinophenyl) butane-1-one, 2-dimethylamino-2-(4-methylbenzyl)-1-(4-morpholin-4-yl-phenyl) butane-1-one, or 3,6-bis(2-methyl-2-morpholinopropionyl)-9-n-octylcarbazole; a benzoin compound, such as benzoin, benzoin ethyl ether, benzoin isopropyl ether, or benzoin isobutyl ether; a benzophenone compound, such as benzophenone, 2-methylbenzophenone, 3-methylbenzophenone, 4-methylbenzophenone, 2,4,6-trimethylbenzophenone, 4-phenylbenzophenone, methyl-2-benzophenone, 1-[4-(4-benzoylphenylsulfanyl)phenyl]-2-methyl-2-(4-methylphenylsulfonyl)propane-1-one, 4,4-bis(dimethylamino)benzophenone, 4,4-bis(diethylamino)benzophenone, or 4-methoxy-4'-dimethylaminobenzophenone; an acylphosphine oxide compound, such as bis(2,4,6-trimethylbenzoyl) phenylphosphine oxide, 2,4,6-trimethylbenzoyldiphenylphosphine oxide, or bis(2,6-dimethoxybenzoyl)-2,4,4-trimethylpentylphosphine oxide; and a thioxanthone compound, such as thioxanthone, 2-chlorothioxanthone, 2,4-diethylthioxanthone, isopropylthioxanthone, 1-chloro-4-propylthioxanthone, 3-[3,4-dimethyl-9-oxo-9H-thioxanthone-2-yl-oxy]-2-hydroxypropyl-N,N,N-trimethylammoniumchloride, or fluorothioxanthone. Examples of compounds other than the examples described above include benzyl, methyl phenylglyoxylate, ethyl(2,4,6-trimethylbenzoyl)phenylphosphinate, ethyl anthraquinone, phenanthrenequinone, and camphorquinone. Among these compounds, the acylphosphine oxide compound is preferable from the viewpoint of obtaining excellent curability when a light emitting diode is used as an ultraviolet light source.

Within a range where the effects of the disclosure do not deteriorate, the photocurable composition may further include a non-curable resin component, a minor component, or the like in addition to the components (A), (B), (C), (D), and (E). Specific examples of the non-curable resin component, the fine component, or the like include a polymer, such as a block copolymer of methyl methacrylate and butyl acrylate that is a non-curable resin component.

In one embodiment, for example, a method of forming the resin layer 20 may include: fixing the laminated electrode body 10 using a mold for resin filling (step a); filling the photocurable composition into a space surrounded by the mold for resin filling and the laminated electrode body 10 (step b); and curing the photocurable composition (step c). The mold for resin filling described in this specification refers to a mold for disposing the photocurable composition on side surfaces of the laminated electrode body 10 by interposing the laminated electrode body 10 from both ends of the laminated electrode body 10 in the direction in which the positive and negative electrodes are laminated. As the mold for resin filling, for example, a material having excellent releasability, such as a fluororesin is used, and Teflon (registered trade name) can be preferably used.

In step a, the laminated electrode body 10 is fixed using the mold for resin filling. The laminated electrode body 10 is fixed by interposing the laminated electrode body 10 with the mold for resin filling from both ends in the laminating direction and pressing the laminated electrode body 10. The laminated electrode body 10 is pressed at a pressure where the laminated electrode body is not damaged or deformed. In step b, the photocurable composition having the composition described above is filled into a space surrounded by the mold for resin filling and the laminated electrode body 10. The amount of the photocurable composition filled is not particularly limited and can be appropriately adjusted depending on the desired thickness of the resin layer. When the resin flows out from the mold for resin filling, the residual resin can be removed by a scraper or the like. In step c, the photocurable composition is cured by irradiating the photocurable composition filled into the mold for resin filling with UV light. As a result, the resin layer 20 is formed.

In the resin layer 20 formed on the side surfaces of the laminated electrode body as described above, the reactivity with the sulfide-based solid electrolyte is suppressed. Accordingly, in the sulfide-based all-solid-state battery including the resin layer, deterioration caused by repeated charging and discharging can be suppressed, and the battery performance can be maintained for a longer period of time as compared to the sulfide-based all-solid-state battery disclosed in the related art in which the side surfaces of the laminated electrode body are sealed using a resin material.

The all-solid-state battery 1 disclosed herein can be used for various applications. For example, the all-solid-state battery 1 can be suitably used as, for example, a power source (electrical power supply for driving) for a vehicle-mounted motor. The type of the vehicle is not particularly limited, but typical examples thereof include vehicles, such as a plug-in hybrid vehicle (PHV), a hybrid vehicle (HV), and an electric vehicle (EV).

Hereinafter, the preferable embodiment will be described using examples, but the examples described below are not intended to limit the disclosure. In the following description, unless specified otherwise, "part" represents "part(s) by weight", and "%" representing a mixing proportion represents "wt %".

Abbreviations

Abbreviations in the description represent as follows.
MCA: 2-methoxyethyl acrylate
MEL: 2-methoxyethanol
DABCO: triethylenediamine
MEHQ: hydroquinone monomethyl ether
TEMPOL: 4-hydroxy-2,2,6,6-tetramethylpiperidine-1-oxyl
DEHA: N,N-diethylhydroxylamine Reaction Yield The reaction yield of an ester exchange reaction in each of manufacturing examples described below was calculated using the following expression after determining MEL produced along with the progress of the ester exchange reaction (MEL derived from MCA used as a raw material). The determination of MEL was performed according to an internal standard method using a high performance liquid chromatograph including a differential refractive index detector (column: Atlantis (Part No. 186003748, column inner diameter; 4.6 mm, column length: 250 mm) manufactured by Waters Corporation, solvent: pure water or 10 vol % isopropanol aqueous solution). Expression: Reaction Yield (mol %)=Molar Number of MEL Produced along with Progress of Ester Exchange Reaction/(Molar Number of Alcohol used as Raw Material×Number of Alcoholic Hydroxyl Groups having Alcohol Molecule used as Raw Material)×100

Measurement of Number Average Molecular Weight (Mn)

Using a GPC system (detector=RI, WATERS 2414 manufactured by Waters Corporation, column: manufactured by Waters Corporation, STYRAGEL HRI (column inner diameter=7.8 mm, column length=300 mm, THF solvent), the number average molecular weight was calculated using a polystyrene standard sample as a reference.

Manufacturing Example: Synthesis of Bifunctional Polyester Acrylate

To a 3 L flask to which a stirrer, a thermometer, a gas introduction tube, a rectification column, and a cooling tube were attached, 240.00 g (0.047 mol) of polyester diol (Mn: 3,699, hydroxyl value: 21.9 mgKOH/g) containing isononanediol and adipic acid, 659.27 g (5.01 mol) of MCA, 0.093 g (0.00083 mol) of DABCO as a catalyst, 0.34 g (0.0017 mol) of zinc acrylate as a catalyst, 0.15 g (167 ppm with respect to the total weight of added raw materials) of MEHQ, and 0.17 g (189 ppm with respect to the total weight of added raw materials) of TEMPOL were added, and oxygen-containing gas (containing 5 vol % of oxygen and 95 vol % of nitrogen) was bubbled. While heating and stirring the reaction solution in a temperature range of 125° C. to 130° C., the pressure in the reaction system was adjusted in a range of $31.2 \times 10^{-3}$ MPa to $32.1 \times 10^{-3}$ MPa (237 mmHg to 244 mmHg), and a mixed solution of MEL and MCA produced along with the progress of the ester exchange reaction was extracted from the reaction system through the rectification column and the cooling tube. In addition, the same weight of MCA as the extracted solution was added to the reaction system as needed. MCA including MEHQ and TEMPOL was added to the reaction system through the rectification column as needed. As a result of determining MEL in the solution extracted from the reaction system, the reaction yield reached 91% 21 hours after the start of heating and stirring. Therefore, the heating of the reaction solution was ended, the pressure in the reaction system was returned to normal pressure, and the extraction was ended. The amounts of MEHQ and TEMPOL added were 0.55 mg and 0.61 mg with respect to 100 g of the total weight of the reaction solution, respectively.

To the reaction solution, 12 g of aluminum silicate (KYOWAAD 700 manufactured by Kyowa Chemical Industry Co., Ltd.) as an adsorbent was added, the reaction solution was heated and stirred in an internal temperature range of 80° C. to 105° C. at normal pressure for 1 hour for a contact treatment, 0.37 g of calcium hydroxide was added in an internal temperature range of 20° C. to 40° C., and the reaction solution was stirred at normal pressure for 1 hour. After separating insoluble matter by pressure filtration, while bubbling dry air in the filtrate, distillation under reduced pressure was performed in a temperature range of 70° C. to 98° C. and a pressure range of 0.001 mmHg to 100 mmHG for 16 hours to separate a distillate including unreacted MCA.

The obtained liquid distillation residue was cooled to room temperature, 0.16 parts (700 ppm with respect to the obtained liquid distillation residue) of DEHA was added, and the reaction solution was stirred at an internal temperature of 80° C. at normal pressure for 3 hours. Next, the solid matter was separated by pressure filtration. As a result of composition analysis of the filtrate using $^1$HNMR after the pressure filtration, it was verified that polyester diacrylate was included as a major component. The purification yield calculated considering that the filtrate was a purified product was 93%. The number average molecular weight (Mn) of the product was 3,565. The bifunctional polyester acrylate obtained in this manufacturing example will be referred to as "PA-1".

Preparation of Photocurable Composition

In Examples, the respective components used for preparing a resin for a test as a photocurable composition are as follows. In addition, abbreviations in Table 1 represent as follows.

Component (A)

PA-1: bifunctional polyester acrylate obtained in the manufacturing example.

M-211: diacrylate of ethylene oxide adduct of bisphenol A (molecular weight of major component: 512), ARONIX M-211B manufactured by Toagosei Co., Ltd.

Component (B)

M-111: acrylate of ethylene oxide adduct of nonylphenol, ARONIX M-111 manufactured by Toagosei Co., Ltd.

M-120: acrylate of ethylene oxide adduct of 2-ethylhexanol, ARONIX M-120 manufactured by Toagosei Co., Ltd.

M-5700: 2-hydroxy-3-phenoxypropyl acrylate, ARONIX M-5700 manufactured by Toagosei Co., Ltd.

Component (C)

M-1200: bifunctional urethane acrylate having a polyester skeleton (number average molecular weight: 1,000 or higher), ARONIX M-1200 manufactured by Toagosei Co., Ltd.

UN-9200: bifunctional urethane acrylate having a polycarbonate skeleton (number average molecular weight: 1,000 or higher), ART RESIN UN-9200A manufactured by Negami Chemical Industrial Co., Ltd.

Component (D)

M-309: trimethylolpropane triacrylate, ARONIX M-309 manufactured by Toagosei Co., Ltd.

Component (E)

TPO: photoradical polymerization initiator OMNIRAD TPO (2,4,6-trimethylbenzoyl-diphenyl-phosphine oxide) manufactured by IGM Resins B. V.

Component (F) (Non-Curable Component)

LA2140: block copolymer of methyl methacrylate and butyl acrylate, KURARITY LA2140 manufactured by Kuraray Co., Ltd.

The respective components were added at proportions shown in Table 1 and were stirred and mixed. As a result, resins for a test described below in Examples 1 to 7 were prepared. During the preparation, the components were optionally heated up to 100° C. at a maximum. The obtained photocurable compositions shown in Table 1 were evaluated as follows. The results are collectively shown in Table 1. Values representing the mixing proportions in the components (A), (B), (C), and (D) as curable components of Table 1 show mixing proportions (wt %) of the respective components when the total content of the components is represented by 100 wt %. Values in the components (E) and (F) show mixing proportions (part(s) by weight) when the total content of the curable components is represented by 100 parts by weight.

TABLE 1

|  |  |  | Example 1 | Example 2 | Example 3 | Example 4 | Example 5 | Example 6 | Example 7 |
|---|---|---|---|---|---|---|---|---|---|
| Formulation | Component (A) | PA-1 | 100 | 60 | 80 |  |  |  |  |
|  |  | M-211 |  | 40 |  | 16 | 100 |  |  |

TABLE 1-continued

|  |  |  | Example 1 | Example 2 | Example 3 | Example 4 | Example 5 | Example 6 | Example 7 |
|---|---|---|---|---|---|---|---|---|---|
|  | Component (B) | M-111 |  |  | 20 |  |  | 30 | 30 |
|  |  | M-120 |  |  |  |  |  | 5 |  |
|  |  | M-5700 |  |  |  | 56 |  | 10 |  |
|  | Component (C) | M-1200 |  |  |  |  |  | 55 |  |
|  |  | UN-9200 |  |  |  | 28 |  |  |  |
|  | Component (D) | M-309 |  |  |  |  |  |  | 70 |
|  | Component (E) | TPO | 0.5 | 0.5 | 0.5 | 0.5 | 0.5 | 0.5 | 0.5 |
|  | Component (F) | LA2140 |  |  |  |  | 14 |  |  |
| Evaluation Result of Resin Material | Oxidation-Reduction Current (mA) |  | 15 | 15 | 15 | 30 | 15 | 300 | 25 |
|  | Evaluation of SE Reactivity/Potential Resistance |  | A | A | A | B | A | D | B |
|  | Storage Elastic Modulus (25° C.)(MPa) |  | 4.3 | 166 | 3.7 | 240 | 1600 | 138 | 3000 |
|  | Evaluation of Flexibility |  | A | B | A | B | C | B | D |
|  | Viscosity (25° C.)(Pa · s) |  | 47.4 | 13.9 | 17.9 | 7.2 | 10.6 | 13.5 | 0.1 |
|  | Evaluation of Penetration into Layers |  | B | B | B | B | B | B | D |
|  | Evaluation of Crack Resistance during Curing |  | B | B | B | B | B | B | D |
|  | Comprehensive Evaluation |  | B | B | B | B | C | D | D |
| Evaluation Result of Battery | Battery Capacity Retention (%) |  | A 93 | A 93 | A 93 | B 89 | A 92 | D 84 | B 88 |
|  | Evaluation of Cycle Characteristics |  |  |  |  |  |  |  |  |

Evaluation of Reactivity with Sulfide-Based Solid Electrolyte and Potential Resistance The resin for a test, SUS, and the sulfide-based solid electrolyte were mixed to prepare a test piece, the oxidation-reduction current was measured by cyclic voltammetry (hereinafter, referred to as "CV"), and the reactivity between the resin material and the sulfide-based solid electrolyte was evaluated. Here, as the sulfide-based solid electrolyte, a sulfide-based solid electrolyte including one or more halogens in the $Li_2S$—$P_2S_5$ system having at least a $PS_4$-ortho skeleton was used. In a glove box, 500 mg of SUS powder, 450 mg of the sulfide-based solid electrolyte, and 50 mg of the obtained resin for a test were weighed and were mixed sufficiently in a dry mortar. As a result, a mixture A was obtained. The mixture A was molded into a cylindrical shape having a diameter ϕ of 10 mm. 100 mg of the sulfide-based solid electrolyte was weighed, was smoothed on the mixture A, and was pressed at 6 t to be laminated. A stretched lithium foil was bonded to a copper foil. An exposed surface of the lithium foil was bonded to the solid electrolyte fixed to the mixture A and was pressed at 0.01 t. As a result, a sample for reactivity evaluation was obtained. The sample was restrained at 6 N and was left to stand in a thermostatic chamber at 25° C. for 1 hour or longer, and CV was performed under the following conditions. After performing 10 cycles, the maximum value of the absolute current value is shown in Table 1 as the value of the reduction current (mA). A case where the current value was 20 mA or lower was evaluated as A, a case where the current value was 20 to 40 mA was evaluated as B, a case where the current value was 40 to 60 mA was evaluated as C, and a case where the current value was higher than 60 mA was evaluated as D.

Conditions of CV: a temperature environment of 25° C.
Scanning range: open circuit potential (set each cycle)→5V→1 V or 0.1 V→open circuit potential
Scanning rate: 1 mV/sec
Number of Cycles: 10 cycles Evaluation of Flexibility By measuring the storage elastic modulus of the cured resin for a test, the flexibility was evaluated. Specifically, a rectangular hole having a width of 5 mm and a length of 50 mm was formed in a silicon rubber having a thickness of 1 mm to prepare a mold, and this mold was bonded to a PET film disposed on a glass plate. The resin for a test was put into the mold, the upper side of the mold was covered with the PET film to prevent entrance of air, and the glass plate was disposed on the PET film. After pressing and fixing the upper and lower glass plates with clips, the resin for a test was cured by irradiating the front and back sides with UV light at 1,000 mJ/cm$^2$, respectively, using a 365 nm LED irradiation device (manufactured by SENTEC Corp., Ltd.) including a stage moving device (the front and back sides were alternately irradiated in two passes at a peak illuminance of 200 mW/cm$^2$, a stage rate of 8 mm/sec, and at 500 mJ/cm$^2$ per pass). After curing, the glass plates were removed, the PET film was peeled off, and the cured product was released from the silicon rubber mold to obtain a test piece. When burrs were present, the burrs were removed by a cutter knife or the like. A dynamic viscoelastic spectrum of the obtained cured product was measured using DMS-6100 (manufactured by Seiko Instruments Inc.) at a frequency of 1 Hz in a temperature range of about −30° C. to 100° C., and the storage elastic modulus at 25° C. was shown in Table 1. A case where the storage elastic modulus was 10 MPa or lower was evaluated as A, a case where the storage elastic modulus was 10 MPa to 1000 MPa was evaluated as B, a case where the storage elastic modulus was 1000 MPa to 2000 MPa was evaluated as C, and a case where the storage elastic modulus was higher than 2000 MPa was evaluated as D.

Evaluation of Penetration into Layers of Laminated Electrode Body

By measuring the viscosity (Pas) of the non-cured resin for a test, the penetration into the layers of the laminated electrode body was evaluated. Using an E-type viscometer (cone plate type viscometer, manufactured by Toki Sangyo Co., Ltd.), the viscosity at 25° C. was measured, and the measurement results were shown in Table 1. In addition to the viscosity measurement, the resin for a test was actually applied to side surfaces of the laminated electrode body and was cured. Next, the laminated electrode body was disassembled to observe the degree of penetration between the layers of the electrodes. A case where the average penetration length of the cured product from the electrode end portions was 5 mm or more was evaluated as D, a case where the average penetration length was about 3 mm to 4 mm was evaluated as C, and a case where the average penetration length was about 2 mm or less was evaluated as B.

Evaluation of Crack Resistance

Two silicon rubber sheets having a thickness of 1 mm, a width of 20 mm, and a length of 150 mm were disposed on a glass plate at an interval of 15 mm to come into close contact with the glass plate. The non-cured resin for a test was filled into this interval, the upper surface was covered with a PET film having a thickness of 188 μm, a glass plate was placed thereon, and the resin for a test was cured by being irradiated with UV light at 1,000 mJ/cm², using a 365 nm LED irradiation device. After curing, the cured product was visually inspected, a case where cracking occurred was evaluated as D, and a case where cracking did not occur was evaluated as B.

Comprehensive Evaluation

The comprehensive evaluation was performed based on the results of the evaluation of reactivity with the sulfide-based solid electrolyte, the evaluation of flexibility, the evaluation of penetration into the layers of the laminated electrode body, and the evaluation of crack resistance. A case where all the evaluation results were B was evaluated as A, a case where all the evaluation results were not C or D was evaluated as B, a case where any one of the evaluation results was not D but C was evaluated as C, and a case where any one of the evaluation results was D was evaluated as D.

Evaluation of Cycle Characteristics

Five single cells having an electrode specification of NCM/LTO, an electrode size of 1 cm², an electrode thickness of 0.3 mm, and a unit cell capacity of 2 mAh were laminated, the non-cured resin for a test having a thickness of 1 mm was applied to electrode outer circumferential side surfaces in an Ar atmosphere, and the resin for a test was cured by being irradiated with UV light at 1,000 mJ/cm², using a 365 nm LED irradiation device. As a result, a small cell for evaluation was prepared. After performing 300 cycles of 2 C/2 C at 60° using this cell, the battery capacity retention was evaluated. A case where the capacity retention was 90% or higher was evaluated as A, a case where the capacity retention was 85% to 89% was evaluated as B, and a case where the capacity retention was lower than 85% was evaluated as D.

Hereinabove, specific examples of the disclosure have been described in detail. However, these examples are merely exemplary and do not limit the claims. The technique described in the claims includes various modifications and alternations of the specific examples.

What is claimed is:

1. A photocurable composition for an all-solid-state battery, the photocurable composition comprising:
    a first component, a fifth component, a second component, and a third component, wherein:
    the first component is a compound with having two (meth)acryloyl groups in one molecule and not having a urethane bond, and a number average molecular weight of 1000 or higher;
    the second component is a compound having one (meth)acryloyl group in one molecule and not having a urethane bond;
    the third component is a compound having one or more (meth)acryloyl groups and one or more urethane bonds in one molecule;
    the fifth component is a photoradical polymerization initiator;
    a total content ratio of the first component and the second component is 60 wt % to 100 wt %;
    a content ratio of the third component is lower than 40 wt %;
    when the total content of the curable components is represented by 100 parts by weight, a content ratio of the fifth component is 0.01 parts by weight to 10 parts by weight;
    a viscosity of the photocurable composition at 25° C. is 1 Pa·s to 100 Pa·s;
    the all-solid-state battery includes a laminated electrode body in which electrode bodies are laminated, each of the electrode bodies including a positive electrode, a negative electrode, and a solid electrolyte layer containing a sulfur material, the positive electrode and the negative electrode being laminated via the solid electrolyte layer; and
    the photocurable composition is a material for forming a resin layer made of a resin cured product, on at least-outer circumferential side surfaces of the laminated electrode body.

2. The photocurable composition according to claim 1, wherein the first component includes a compound having a polyester skeleton.

3. An all-solid-state battery comprising:
    a laminated electrode body in which electrode bodies are laminated, each of the electrode bodies including a positive electrode, a negative electrode, and a solid electrolyte layer containing a sulfur material, the positive electrode and the negative electrode being laminated via the solid electrolyte layer; and
    a resin layer formed on at least a part of a side surface between an upper surface and a lower surface, the upper and lower surfaces being two wide surfaces at both ends of the laminated electrode body in a direction in which the electrode bodies are laminated, wherein
    the resin layer is formed of a cured product of the photocurable composition according to claim 1.

4. The all-solid-state battery according to claim 3, wherein after performing a durability test where the battery is charged and discharged in 300 cycles at a temperature of 60° C., a charging condition of 2 C, and a discharging condition of 2 C, a battery capacity retention is 90% or higher.

5. The all-solid-state battery according to claim 1, further comprising a fourth component, the fourth component being a compound having an ethylenically unsaturated group different from the first component, the second component, and the third component;

when a total content of the first component, the second component, the third component, and the fourth component that are curable components is represented by 100 wt %,
a total content ratio of the first component and the second component is 60 wt % to 100 wt %,
a content ratio of the third component is lower than 40 wt %, and
a content ratio of the fourth component is lower than 40 wt %.

* * * * *